3,728,222
PROCESS FOR PREPARING NICOTINAMIDE ADENINE DINUCLEOTIDE PHOSPHATE
Fumio Kato, Akira Yamaguchi, Toshio Tatano, and Yoshiaki Shimizu, Shizuoka-ken, Japan, assignors to Kyowa Hakko Kogyo Kabushiki Kaisha, Tokyo-to, Japan
No Drawing. Filed Oct. 12, 1971, Ser. No. 188,478
Claims priority, application Japan, Oct. 27, 1970, 45/93,910
Int. Cl. C12d 13/06
U.S. Cl. 195—28 N                                    14 Claims

ABSTRACT OF THE DISCLOSURE

Nicotinamide adenine dinucleotide phosphate is prepared by fermentation of microorganisms selected from the group of Brevibacterium ammoniagenes, Arthrobacter ureafaciens, Arthrobacter citreus, Corynebacterium rathayi, Micrococcus varians, Serratia marcescens, Candida utilis, Saccharomyces cerevisiae and Streptomyces aureus. Fermentation takes place in a culture medium containing at least one of the following: nicotinic acid, nicotinic acid amide, nicotinic acid mononucleotide, nicotinamide mononucleotide, nicotinic acid riboside, nicotinamide riboside, and nicotinic acid adenine dinucleotide; together with adenine derivatives.

BRIEF DESCRIPTION OF THE INVENTION

The present invention relates to a process for preparing nicotinamide adenine dinucleotide phosphate (hereinafter designated as NADP) by fermentation.

An object of the present invention is to provide a process for preparing NADP by fermentation with less cost and on an industrial scale.

NADP which is also sometimes called "coenzyme II," "dehydrogenation coenzyme II" or "triphosphopyridine nucleotide" is an essential compound in the biochemical field and is represented by the following formula:

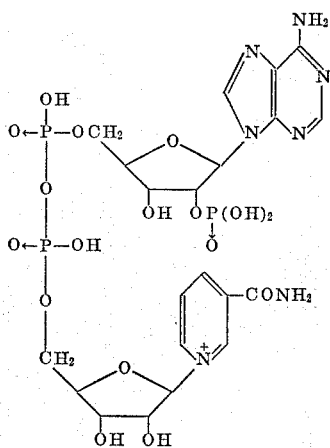

As a result of extensive studies in the preparation of nucleotides by fermentation, we have discovered that large amounts of NADP can be produced and accumulated by fermentation, provided an NADP-producing microorganism is cultured in a medium containing at least one member of the class consisting of nicotinic acid, nicotinic acid amide, nicotinic acid mononucleotide, nicotinamide mononucleotide, nicotinic acid riboside, nicotinamide riboside and nicotinic acid adenine dinucleotide, and at least one member of the class consisting of adenine and derivatives thereof, e.g., adenine riboside, adenine ribotide plus a surface active agent. These additives should be present in the culture medium during the cultivation.

DETAILED DESCRIPTION OF THE INVENTION

According to the present invention, there is provided a process for preparing NADP by fermentation, characterized in that an NADP-producing microorganism is cultured in a medium containing at least one member of the class consisting of nicotinic acid, nicotinic acid amide, nicotinic acid mononucleotide, nicotinamide mononucleotide, nicotinic acid riboside, nicotinamide riboside, nicotinic acid adenine dinucleotide, and at least one member of the class consisting of adenine and derivatives thereof plus a surface active agent. These additives should be present in the medium during the cultivation.

Examples of NADP-producing microorganisms which may be used for the purpose of the present invention include Brevibacterium ammoniagenes American Type Culture Collection (hereinafter abbreviated ATCC) 6871, Brevibacterium ammoniagenes ATCC 6872, Arthrobacter ureafaciens ATCC 7652, Arthrobacter citreus ATCC 11624, Corynebacterium rathayi ATCC 13659, Micrococcus varians ATCC 399, Serratia marcescens ATCC 19180, Candida utilis ATCC 9950, Saccharomyces cerevisiae ATCC 15248, Streptomyces aureus ATCC 3309 etc., although any of other microorganisms may be used as far as they are capable of producing NADP by fermentation.

As the culture medium it is possible to use any and all medium containing a suitable amount of carbon sources such as saccharine materials (e.g. glucose, starch hydrolysate, molasses), and hydrocarbons, nitrogen sources (e.g. urea, ammonium chloride, ammonium nitrate), inorganic materials (e.g. potassium phosphate, magnesium sulfate, potassium chloride) and nitrogen-containing natural sources (e.g. corn steep liquor, yeast extract, meat extract, peptone, fish meal). In case the used strain has a special nutritional requirement, it is necessary to add to the medium the required nutritional substances.

At least one member of nicotinic acid, nicotinic acid amide, nicotinic acid mononucleotide, nicotinamide mononucleotide, nicotinic acid riboside, nicotinamide riboside and nicotinic acid adenine dinucleotide as well as adenine or its derivatives should exist in the medium. These substances may be added to the medium in the beginning or at some time during the course of cultivation. The amount of the compounds are preferably present from about 50 mg./l. to 10 g./l.

As the surface active agent, it is possible to use various surface active agents such as cetyl trimethyl ammonium bromide (CTAB), cetyl pyridinium chloride (CPC), trimethyl octadecyl ammonium chloride, alkyl dimethylbenzyl ammonium chloride, polyoxyethylene alkylamine, derivatives of hydroxyethylglyoxalizine, lauryl trimethyl ammonium chloride, polyoxyethylene stearylamine, etc.; anionic surfactants such as sodium lauryl sulfate (SLS), sodium oleylamide sulfate (SOAS), etc. and nonionic surfactants such as trioxyethylene sorbitan monostearate, trioxyethylene sorbitan monopalmitate, etc. The amount of the surfactant added to the medium may vary, depending upon the types of the surfactants and upon when it is added. But it is preferred to use the surfactant at a concentration of from about 0.01% to 0.5%.

The fermentation is carried out under aerobic conditions created by shaking while culturing, or by submerged culture with aeration and agitation, etc. Fermentation is preferably carried out at a temperature of about 20–40° C. and at a pH of from about 5.5 to 9.0.

Culturing usually takes two to eight days to produce and accumulate a substantial amount of NADP in the medium.

After the completion of the cultivation, NADP can be recovered by any suitable well known prior art methods such as ion exchange resin treatment, adsorption, etc.

The following non-limitative examples illustrate the invention.

EXAMPLE I

*Brevibacterium ammoniagenes* ATCC 6872 was used for seed culture. A medium consisting of glucose (3%), meat extract (1.0%), peptone (1.0%) and sodium chloride (0.25%) was prepared and adjusted to pH 7.5 with sodium hydroxide. The seed culture medium was distributed into 2-liter conical flasks in 300 ml. portions and was thereafter cooked for sterilization. Urea in an amount of 0.25% by weight, and which had been separately sterilized, was added to the medium which was then inoculated with the seed strain. The inoculated seed culture was thereafter cultured at 28° C. for 24 hours with shaking.

A fermentation medium consisting of glucose (14%), meat extract (0.6%), potassium monohydrogen phosphate (1.4%), potassium dihydrogen phosphate (1.4%), magnesium sulfate (1.4%), calcium chloride (0.01%), ferrous sulfate (0.001%), zinc sulfate (0.001%), L-cystine (20 mg./l.), β-alanine (5 mg./l.), biotin (30 mcg./l), thiamine (5 mg./l.) and manganese sulfate (100 mcg./l.) was prepared and adjusted to pH 7.0, cooked for sterilization. 0.2% of urea which had been separately sterilized was then added.

The seed culture was inoculated into 3 liters of the thus prepared fermentation medium, put in a 5-liter jar fermenter at an inoculum size of 1/10 by volume. The mixed seed and fermentation cultures were then cultured at 32° C. with an agitation of 650 r.p.m. and an aeration of 3 l./min. while controlling the pH at 7.0 with ammonia. After culturing for 30 hours, 3 g./l. (concentration after addition) each of adenine and nicotinic acid, both of which had separately been sterilized, was added. Further, after culturing for 48 hours, 2 g./l. (concentration after addition) of a hydroxyethylglyoxalizine derived surfactant, which had separately been sterilized, was added.

The strain was thereafter cultured for an additional 96 hours to form an accumulate 0.8 g./l. of NADP in the fermented liquor.

The NADP was recovered by ion exchange treatment.

EXAMPLE II

The culturing was carried out in a similar manner to that described in Example I but 3 g./l. of nicotinic acid amide was substituted for nicotinic acid and 2.5 g./l. of polyoxyethylene alkylamine substituted for the previous surfactant. 1.2 g./l. of NADP was formed and accumulated in the fermented liquor.

EXAMPLE III

A seed culture was prepared in a similar manner to that described in Example I. A medium consisting of glucose (3%), meat extract (1.0%), peptone (1.0%), potassium monohydrogen phosphate (0.1%), potassium dihydrogen phosphate (0.1%), magnesium sulfate (0.1%), ferrous sulfate (0.002%), zinc sulfate (0.001%), β-alanine (5 mg./l.), biotin (5 mcg./l.), thiamine (0.5 mg./l.) and manganese sulfate (100 mcg./l.) in a 200-liter fermenter was adjusted to pH 7.2 with sodium hydroxide and was sterilized by cooking. The seed culture was inoculated into 100 liters of the thus-prepared medium at an inoculum size of 1/50 by volume and was cultured at 32° C. with an agitation of 250 r.p.m. and an aeration of 60 l./min.

After culturing for 18 hours, the cultured liquor was inoculated into 1 kl. of a fermentation medium prepared in a similar manner to that described in Example I in a 2-kl. fermenter at an inoculum size of 1/10 by volume. After cultured for 24 hours, glucose was added to give a concentration of 7.5% (after addition). The culturing was carried out for an additional 96 hours in a similar manner to that described in Example II to form and accumulate 1.8 g./l. of NADP in the fermentation medium after completion of the culturing.

The foregoing description and examples are illustrative of the process of the herein-described invention. It will be appreciated that various changes and modifications may be made thereto without departing from the spirit of the invention. All such modifications and changes are considered as part of the present invention to the extent they fall under the claims appended hereto.

We claim:

1. A process for preparing nicotinamide adenine dinucleotide phosphate, comprising culturing a nicotinamide adenine dinucleotide, phosphate producing microorganism in a culture medium containing at least one member of the group consisting of nicotinic acid, nicotinic acid amide, nicotinic acid mononucleotide, nicotinamide mononucleotide, nicotinic acid riboside, nicotinamide riboside and nicotinic acid adenine dinucleotide; together with at least one member of the group consisting of adenine and the derivatives thereof and a surface active agent; and thereafter separating nicotinamide adenine dinucleotide phosphate from the cultured material.

2. A process as claimed in claim 1 in which said microorganism is selected from the group consisting of *Brevibacterium ammoniagenes*, *Arthrobacter ureafaciens*, *Arthrobacter citreus*, *Corynebacterium rathayi*, *Micrococcus varians*, *Serratia marcescens*, *Candida utilis*, *Sacchraomyces cerevisiae* and *Streptomyces aureus*.

3. A process as claimed in claim 2 in which said microorganism is *Brevibacterium ammoniagenes* ATTC 6871 and ATCC 6872.

4. A process as claimed in claim 2 in which said microorganism is *Arthrobacter ureafaciens* ATCC 7562.

5. A process as claimed in claim 2 in which said microorganism is *Arthrobacter citreus* ATCC 11624.

6. A process as claimed in claim 2 in which said microorganism is *Corynebacterium rathayi* ATCC 13659.

7. A process as claimed in claim 2 in which said microorganism is *Micrococcus varians* ATCC 399.

8. A process as claimed in claim 2 in which said microorganism is *Serratia marcescens* ATCC 19180.

9. A process as claimed in claim 2 in which said microorganism is *Candida utilis* ATCC 9950.

10. A process as claimed in claim 2 in which said microorganism is *Saccharomyces cerevisiae* ATCC 15248.

11. A process as claimed in claim 2 in which said microorganism is *Streptomyces aureus* ATCC 3309.

12. A process as claimed in claim 1 in which said culture medium comprises carbon sources, nitrogen sources, inorganic sources and nitrogen-containing natural sources.

13. A process as claimed in claim 1 in which the cultivation is carried out under aerobic conditions at a temperature of from about 20 to 40° C., at a pH of from about 5.5 to 9.0 for about 2 to 8 days.

14. A process for preparing nicotinamide adenine dinucleotide phosphate, comprising culturing a microorganism selected from the group consisting of *Brevibacterium ammoniagenes* ATCC 6871, *Berivbacterium ammoniagenes* ATCC 6872, *Arthrobacter ureafaciens* ATCC 7562, *Arthrobacter citreus* ATCC 11624, *Corynebacterium rathayi* ATCC 13659, *Micrococcus varians* ATCC 399, *Serratia marcescens* ATCC 19180, *Candida utilis* ATCC 9950, *Saccharomyces cerevisiae* ATCC 15248 and *Streptomyces aureus* ATCC 3309 under aerobic conditions at a temperature of from about 20 to 40° C. at a pH of from about 5.5 to 9.0 for about 2 to 8 days in a culture medium containing at least one member selected from the group consisting of nicotinic acid, nicotinic acid amide, nicotinic acid mononucleotide, nicotinamide mononucleotide, nicotinic acid riboside, nicotinamide riboside and nicotinic acid adenine dinucleotide; and at least one other member selected from the group consisting of adenine and derivatives thereof; and a surface active agent; and carbon sources, nitrogen sources, inorganic sources and nitrogen-containing natural sources, and thereafter separating nicotinamide adenine dinucleotide phosphate from the cultured material.

References Cited

UNITED STATES PATENTS 3,368,947   2/1968   Nakayama et al. ____ 195—28 N

ALVIN E. TANENHOLTZ, Primary Examiner